United States Patent
He

(10) Patent No.: US 8,812,181 B2
(45) Date of Patent: Aug. 19, 2014

(54) METHODS AND SYSTEMS TO ACCURATELY DISPLAY LATERAL DEVIATION SYMBOLOGY IN OFFSET APPROACHES TO RUNWAYS

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 2152 days.

(21) Appl. No.: 11/169,452

(22) Filed: Jun. 29, 2005

(65) Prior Publication Data

US 2007/0106433 A1    May 10, 2007

(51) Int. Cl.
*G06G 7/76* (2006.01)
*G06F 19/00* (2011.01)
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ............................................. 701/16; 701/3

(58) Field of Classification Search
USPC ........ 701/301, 96, 3, 16, 14, 15, 17; 342/104, 342/109, 229
See application file for complete search history.

(56) References Cited

U.S. PATENT DOCUMENTS

| 3,784,969 | A | | 1/1974 | Wilckens et al. |
| 4,368,517 | A | * | 1/1983 | Lovering ........................ 701/16 |
| 4,419,079 | A | | 12/1983 | Georges et al. |
| 5,420,582 | A | | 5/1995 | Kubbat et al. |
| 5,745,863 | A | * | 4/1998 | Uhlenhop et al. ............. 701/14 |
| 6,085,145 | A | * | 7/2000 | Taka et al. ..................... 701/120 |
| 6,111,526 | A | | 8/2000 | Aymeric et al. |
| 6,317,059 | B1 | | 11/2001 | Purpus et al. |
| 6,320,579 | B1 | | 11/2001 | Snyder et al. |
| 2002/0099528 | A1 | * | 7/2002 | Hett ................................ 703/13 |
| 2003/0132860 | A1 | | 7/2003 | Feyereisen et al. |

OTHER PUBLICATIONS

PCT Search Report, PCT/US2006/025744, dated Nov. 26, 2007.

\* cited by examiner

*Primary Examiner* — Imran Mustafa
(74) *Attorney, Agent, or Firm* — Ingrassia Fisher & Lorenz, P.C.

(57) ABSTRACT

Systems and methods to accurately display lateral deviation symbology in offset approaches to runways is provided. A system for on-aircraft display of lateral deviation symbology for use in offset approaches comprises means for generating a conformal video display representation of an aircraft's current position, means for notifying a flight crew of the existence of an offset approach, means for displaying an extended runway center line, and means for displaying an approach line.

18 Claims, 6 Drawing Sheets

METHODS AND SYSTEMS TO ACCURATELY DISPLAY LATERAL DEVIATION SYMBOLOGY IN OFFSET APPROACHES TO RUNWAYS

TECHNICAL FIELD

The present invention generally relates to aircraft navigation instrumentation and more specifically to displaying lateral deviation symbology.

BACKGROUND

The primary approach system used by most airports is the Instrument Landing System (ILS). ILS facilities provide an accurate and dependable means of navigating an aircraft to most runways for landing. An ILS transmits narrow horizontal beams which let flight crews know if their aircraft is left, right, or directly on course for a runway. The signal transmitted by the ILS consists of two vertical fan-shaped beam patterns that overlap at the center. Ideally, the beams are aligned with the extended centerline of the runway. The right side beam is typically referred to as the "blue" area while the left side of beam is the "yellow" area. An overlap between the two beams provides an on-track signal to aircraft. Ideally, at the point where ILS receivers on the aircraft receive blue area and yellow area beams signals of equal intensity, the aircraft is located precisely on the approach track of the runway centerline.

Due to the presence of terrain, physical obstacles, or political situations, some approaches to runways are guided by an ILS with a beam direction not aligned with the runway centerline direction. When executing such a runway approach, flight crews must follow the ILS beams to a point, but then turn the aircraft to the true runway direction for final landing.

This misalignment between the runway centerline direction and the ILS approach line direction creates difficulties when displaying information for such an approach on high resolution symbolic visual display systems, such as conformal perspective view visual displays, because published bearing numbers and ILS signals for the runway may not provide sufficient accuracy and resolution to properly display the approach line over an extended range. Additionally, flight crews must be made aware of the existence of the offset approach, and on the whereabouts of the transition point in order to deviate from the ILS approach line and turn the aircraft towards the runway direction.

For the reasons stated above and for other reasons stated below which will become apparent to those skilled in the art upon reading and understanding the specification, there is a need in the art for systems and methods to accurately display lateral deviation symbology in offset ILS approaches.

SUMMARY

The Embodiments of the present invention provide methods and systems for to accurately display lateral deviation symbology in offset approaches and will be understood by reading and studying the following specification.

In one embodiment, a graphical display system for an aircraft is provided. The system comprises a processor adapted to perform real-time computations necessary for generating graphical representations of the aircraft's position, wherein the processor is further adapted to generate a first lateral deviation symbology representing the aircraft's current position with respect to an approach line, and generate a second lateral deviation symbology representing the aircrafts current position with respect to an extended runway center line. The system further comprises a runway assistance landing system receiver coupled to the processor, the runway assistance landing system receiver adapted to receive signals for the processor transmitted by an airport runway assistance landing system; one or more aircraft position sensors coupled to the processor, the sensors adapted to detect the position of the aircraft; and a display coupled to the processor, the display adapted to display the graphical representations generated by the processor.

In another embodiment, a system for on-aircraft display of lateral deviation symbology for use in offset approaches is provided. The system comprises means for generating a conformal video display representation of an aircraft's current position; means for notifying a flight crew of the existence of an offset approach; means for displaying an extended runway center line; and means for displaying an approach line.

In yet another embodiment, a method for landing an aircraft at an airport runway having an offset approach is provided. The method comprises aligning a first conformal lateral deviation symbology with an approach line during an approach prior to reaching a transition point; turning the aircraft upon reaching the transition point; and aligning a second conformal lateral deviation symbology with an extended runway center line during an approach after reaching the transition point.

In still another embodiment, a computer-readable medium having computer-executable program instructions for a method for displaying lateral deviation symbology in offset approaches is provided. The method comprises notifying a flight crew of the existence of an offset approach; displaying an extended runway center line; and displaying an approach line.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Although the examples of embodiments in this specification are described in terms of the currently widely used ILS, embodiments of the present invention are not limited to applications of airports utilizing ILS. To the contrary, embodiments of the present invention are applicable to any runway utilizing a runway assistance landing system (of which ILS is an example) that transmits a signal to aircraft indicating an approach line to a runway that is offset from the runway's true centerline. Alternate embodiments of the present invention to those described below may utilize whatever runway assistance landing system signals are available to dynamically calibrate and determine a precise approach course to a runway and display the approach course relative to the runway centerline direction to pilots.

Figure 1:
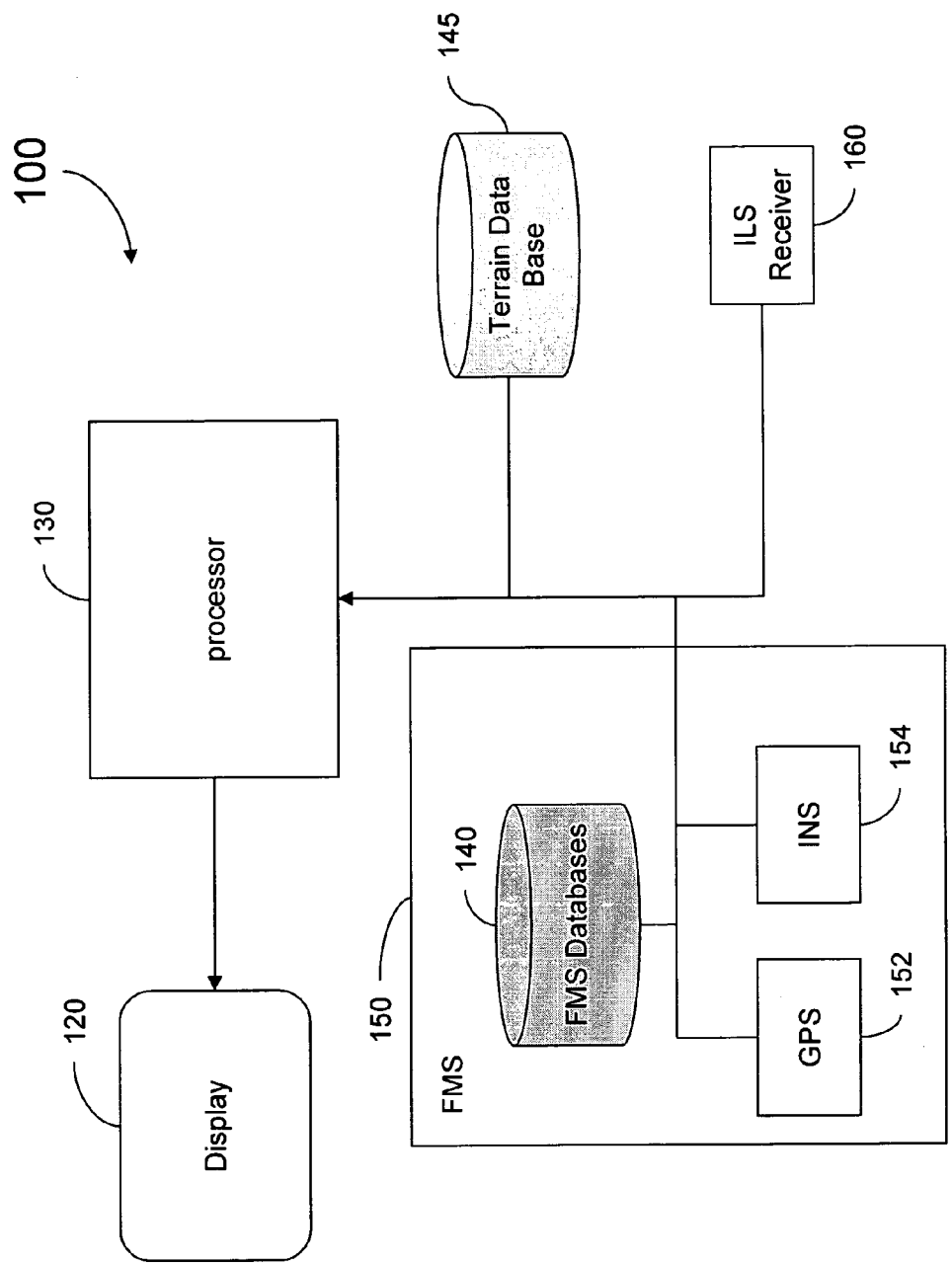
FIG. 1 is a block diagram illustrating a graphical display system of one embodiment of the present invention.

FIG. 1 illustrates a system 100 for accurately displaying lateral deviation symbology in offset ILS approaches of one embodiment of the present invention. System 100 comprises a display 120 adapted for displaying symbolic representations of data, such as, but not limited to aircraft, terrain, and runway position information generated by processor 130. In one embodiment, system 100 is a Honeywell PRIMUS EPIC integrated avionics systems wherein processor 130 is a graphic display generation computer, such as the Honeywell Advanced Graphics Module embedded within the Honeywell PRIMUS EPIC system. In one embodiment, display 120 is a head-down display, such as a flat panel video display. In other embodiments, display 120 is a head-up display (HUD) adapted to project information into a pilot's field of vision.

System 100 addresses the problems with accurately displaying lateral deviation symbology for offset runway approaches by providing an aircraft flight crew graphical representations of both the ILS approach line for a runway and the runway's centerline together with a graphical representation of the aircraft's location with respect to the ILS approach line and the runway's centerline. Additionally, system 100 graphically illustrates for the flight crew the point where the aircraft should stop following the ILS approach line, and start aligning with the runway's centerline for landing.

Processor 130 is adapted to perform real-time computations necessary for generating conformal perspective view graphical representations of an aircraft's position with respect to other objects of interest. As used in this application, a conformal video display is characterized as having the ability to present information using a set of symbols that are conformal with the outside environment (e.g. having perspective, proportions and relationships that are true to reality.) Processor 130 is connected to flight management systems (FMS) 150 for obtaining aircraft parameters such as aircraft position and attitude. In one embodiment, FMS 150 obtains aircraft position and attitude from sensors such as GPS sensor 152 and inertial navigation system (INS) 154. FMS 150 further comprises one or more flight management system databases 140 adapted to provide processor 130 with data necessary to generate accurate graphical representations of one or more of airport runways, airport runway centerlines, and ILS beacon positions. In one embodiment, processor 130 is adapted to uplink data necessary to generate accurate graphical representations of one or more of airport runways, airport runway centerlines, and ILS beacon positions. Processor 130 is also connected to ILS receiver 160 for receiving ILS signals transmitted by airport ILS systems. System 100 includes terrain data base 145 which is adapted to provide processor 130 with data necessary to generate accurate graphical representations of the terrain in the proximity of the aircraft.

Figure 2:
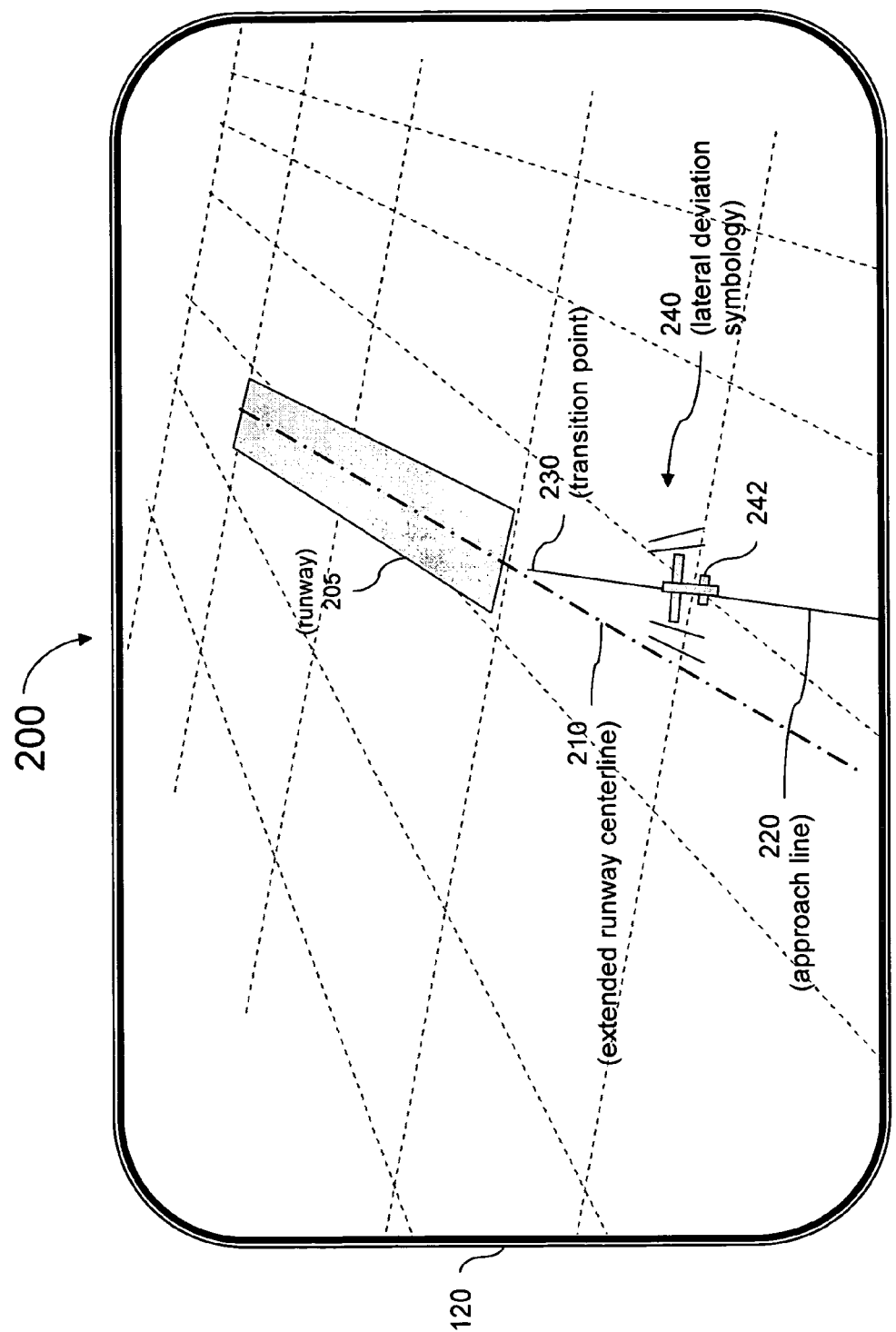
FIG. 2 is a diagram illustrating a conformal perspective view display of an offset approach of one embodiment of the present invention.

FIG. 2 illustrates a conformal 3D perspective view 200 provided by display 120 to a flight crew as their aircraft prepares to land at an airport runway 205 having an offset approach. For an offset approach runway, processor 130 notifies the flight crew of the existence of the offset approach by generating both an extended runway centerline 210 and an ILS approach line 220 on display 120. In one embodiment, extended runway centerline 210 and ILS approach line 220 are displayed such that they are easily discernable from each other (e.g. differing colors, line thicknesses, solid lines verses dashed lines). Information provided to a flight crew by view 200 of one embodiment of the present invention includes the existence of the offset approach, visual display of the true runway centerline, and a visual indication of the degree of the offset between the ILS approach and the true runway centerline.

View 200 further visually provides the flight crew with the location of transition point 230, where the aircraft must turn to align itself with runway 205 for landing. Transition point 230 indicates the point where extended runway centerline 210 and ILS approach line 220 intersect. As an aircraft initially approaches runway 205 for landing, the flight crew follows ILS approach line 220 until the aircraft reaches transition point 230. Upon reaching transition point 230, the flight crew adjusts the flight path of the aircraft to align the aircraft with extended runway center line 210 to complete the approach to runway 205. In one embodiment, ILS approach line 220 is terminated at the point of intercepting extended runway centerline 210 to indicate transition point 230.

The ILS approach line 220 is determined by using one or more position points derived from ILS signals received by ILS receiver 160, and from runway configuration data, to provide a real-time direction calibration, which ensures its accurate positioning and orientation on conformal perspective visual display 120. In one embodiment, upon receiving data from an ILS signal from an airport, processor 130 performs a calibration prior to displaying ILS approach line 220. Calibrating ILS approach line 220 with respect to the intended landing target ensures the correct positioning of ILS approach line 220 on display 120. In straight-in non-offset approaches, such calibration is not needed as the runway end data points are sufficiently accurate to align the approach line and runway center line. The spatial position and orientation of ILS approach line 220 is determined and calibrated by using ILS signals received, relative to current aircraft position, runway position, and ILS beacon positions. The calibration is conducted at a distance from the runway where a sufficient and valid ILS signal is received. In one embodiment, processor 130 determines whether the ILS signal strength meets a sufficient threshold to provide reliable guidance data. Processor 130 then correlates the aircraft's current location (e.g. as determined by one or more of onboard GPS sensors 152 and inertial navigation system (INS) sensors 154) and runway 205 location data to compute where the aircraft is in relation to runway 205, and to compute the lateral deviation between the aircraft's current flight path and ILS approach line 220. A zero lateral deviation corresponds to a position on the approach line. Non-zero deviations correspond to positions having a known angle with respect to the approach line as measured from a lateral deviation source point. Processor 130 then generates the spatial position and orientation of the approach line and conformal lateral deviation symbology 240 with respect to the approach line, which displays to the flight crew the deviation between the aircrafts current position (indicated by aircraft symbol 242) and ILS approach line 220.

Figure 3:
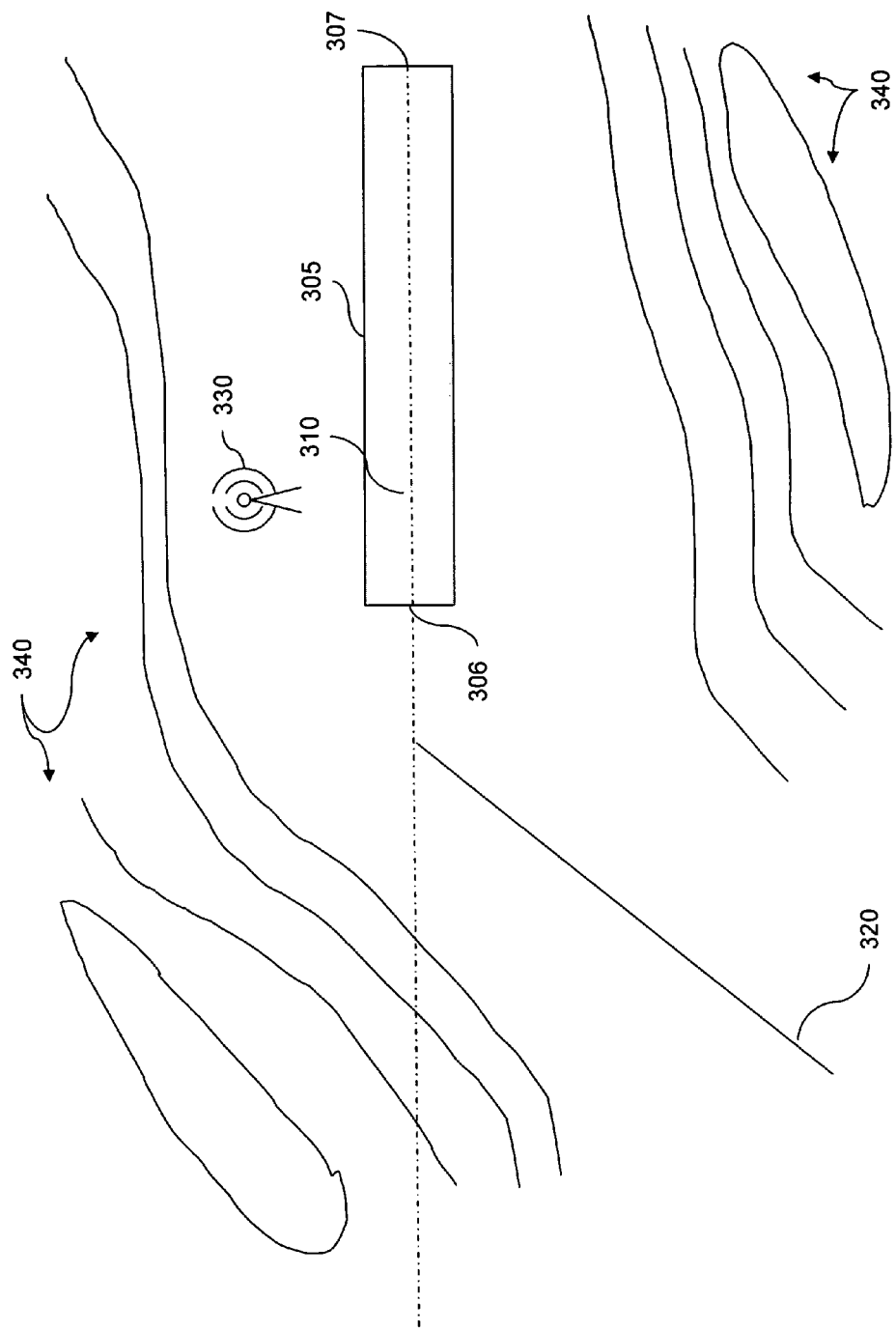
FIG. 3 is a diagram illustrating an offset approach runway facility of one embodiment of the present invention.

FIG. 3 illustrates an example of a runway 305 having an approach line 320 offset from the runway centerline 310 due to terrain 340 surrounding runway 305. In one embodiment, runway location data used by processor 130 to generate extended runway centerline 210 includes coordinates for a runway beginning center point 306 and a runway end center point 307. In one embodiment, the runway end location data includes the longitude and latitude coordinates of center points 306 and 307. In one embodiment, processor 130 calculates centerline 310 based on a line that intersects runway beginning center point 306 and runway end center point 307 in order to generate and display extended runway centerline 210. In one embodiment, runway end location data for runway 305 is resident within one or more FMS databases 140. In one embodiment, runway end location data for runway 305 is uplinked to processor 130 by one or more transmitters 330 local to runway 305.

Figure 4:
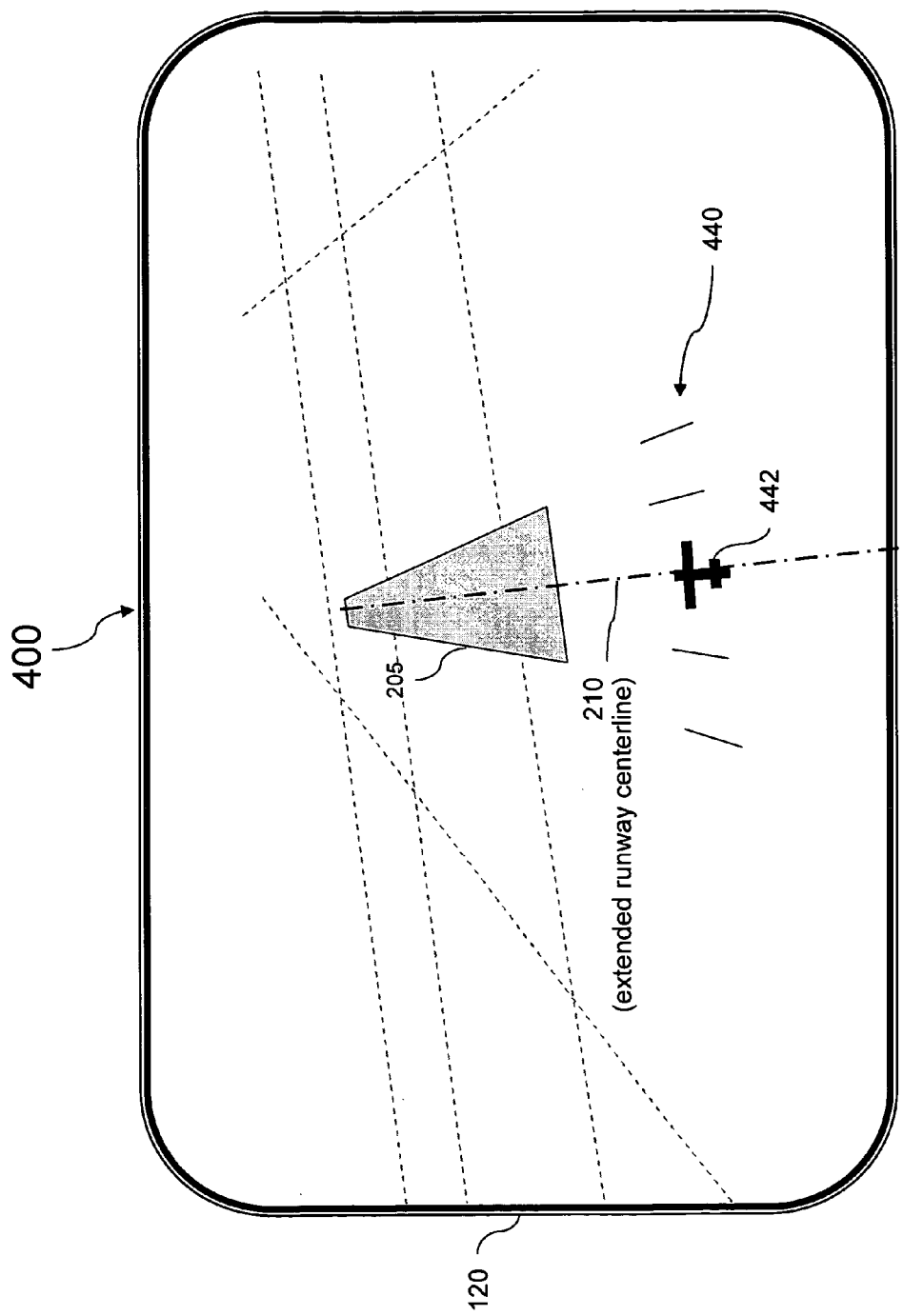
FIG. 4 is a diagram illustrating a conformal perspective view display of an offset approach after arriving at the transition point, of one embodiment of the present invention.

FIG. 4 illustrates a conformal 3D perspective view 400 provided by display 120 to a flight crew approaching runway 205 for landing, after their aircraft reaches transition point 230. When the aircraft position reaches transition point 230, ILS approach line 220 no longer provides valid guidance for landing on runway 205. The flight crew must align the aircraft with the extended runway center line 210 to correctly land the aircraft. In one embodiment, when processor 130 determines that the aircraft has reached transition point 230, processor 130 stops displaying ILS approach line 220. Processor 130 then shifts to correlating the aircraft's current location, as provided by FMS 150, with runway 205 location data, in order to compute where the aircraft is in relation to runway 205, and to compute the lateral deviation between the aircrafts current flight path and extended runway center line 210. Processor 130 generates conformal lateral deviation symbology 440 which displays to the flight crew the deviation between the aircrafts current position (indicated by aircraft symbol 442) and the extended runway center line 210. In one embodiment, processor 130 differentiates the appearance of conformal lateral deviation symbology 440 from conformal lateral deviation symbology 240 (e.g. by changing the color or shape of the symbology) in order to indicate to the flight crew that display 120 is now displaying conformal position approach information as determined by FMS 150 rather than ILS signals.

In one embodiment, processor 130 displays offset approach information (e.g. display both an ILS approach line 220 and a separate extended runway centerline 210) only for airport runways having an offset approach. In one embodiment processor 130 detects whether a given runway possess an offset approach by comparing runway direction data from FMS database 140 for that runway with the approach line direction provided by that runway's ILS signals. As would be appreciated by one skilled in the field of aviation, there is sometimes a normal, nominal offset between the runway centerline direction and the approach line direction provided by ILS signals. Nominal offsets for a given runway may vary with time over the course of a year, or shift due to changes in the Earth's magnetic field. Therefore, in one embodiment, processor 130 is adapted to display offset approach information when it detects an offset in excess of a threshold offset which is based on an expected nominal offset. In one embodiment processor 130 determines whether a given runway possess an offset approach by evaluating runway direction data uplinked to processor 130 by one or more transmitters 330 local to runway 305. In one embodiment, runway direction data includes, but is not limited to, the position, elevation and bearing of the runway, and ILS beam orientation. Additionally some flight crew pilots possess sufficient experience to know when certain airport runways have offset approaches. Accordingly, in one embodiment, processor 130 is adapted to allow the pilot to manually activate the offset approach display functions describe in regards to FIGS. 2 and 4 above.

Figure 5:
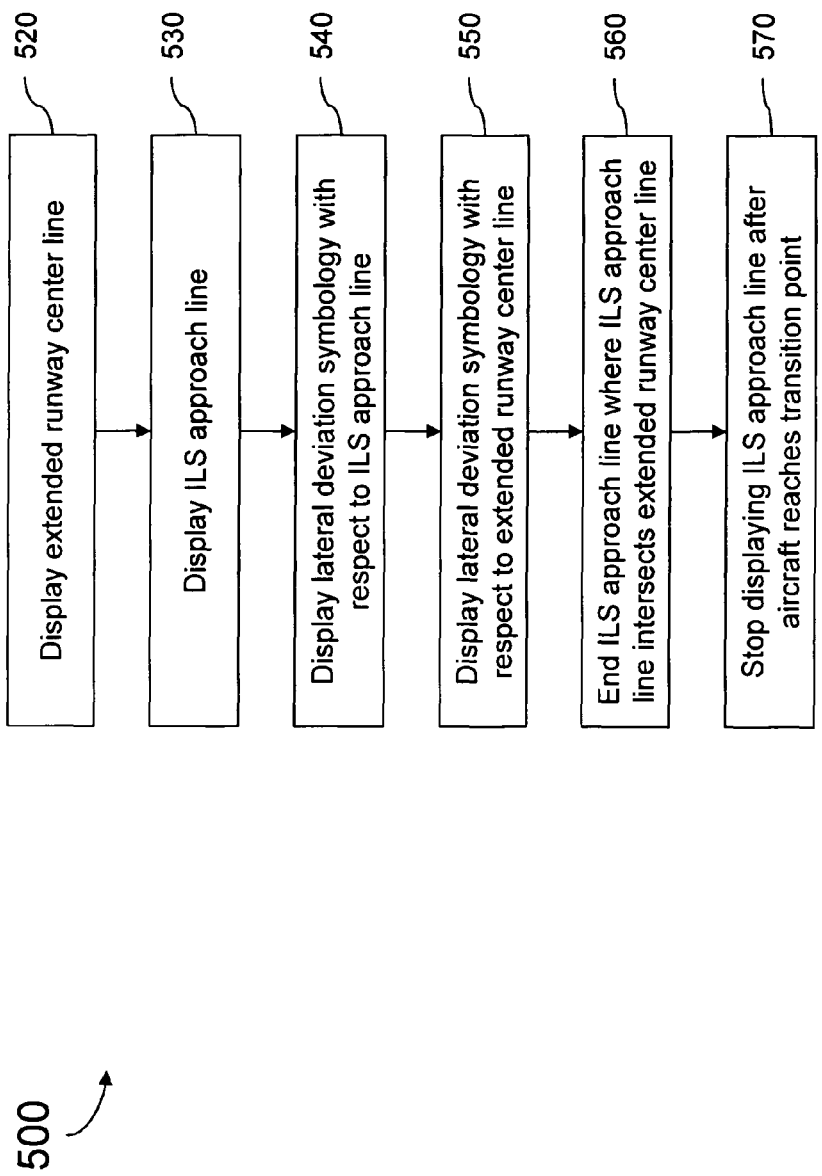
FIG. 5 is a flow chart illustrating a method for displaying lateral deviation symbology in offset ILS approaches, of one embodiment of the present invention.

FIG. 5 illustrates a method 500 for displaying lateral deviation symbology in offset ILS approaches, of one embodiment of the present invention. The method comprises displaying an extended runway center line (520) and displaying an ILS approach line (530). Displaying both an extended runway centerline and an ILS approach line notifies the flight crew of the existence of the offset approach, informs a flight crew of the true runway centerline, and illustrates the degree of the offset between the ILS approach and the true runway centerline. Further, the point where the extended runway centerline and the ILS approach line intersect provides the flight crew with the location of the transition point, where the aircraft should stop following the ILS approach line, and start following the extended runway centerline to land the aircraft. In one embodiment, the method further comprises displaying a first conformal lateral deviation symbology with respect to the ILS approach line (540) as an aircraft is approach a transition point, and displaying a second conformal lateral deviation symbology with respect to the extended runway center line (550) after the aircraft has reached the transition point. The first and second conformal lateral deviation symbology, indicate to the pilot the degree of the aircraft's lateral deviation from the ILS approach line and the extended runway centerline, respectively. In one embodiment, the first conformal lateral deviation symbology is distinguishable from the second conformal lateral deviation symbology. In one embodiment, the first conformal lateral deviation symbology is differentiated from the second conformal lateral deviation symbology by one or more of a different color, a different line thickness, or a different line style. Additionally the extended runway center line may be a different color from the ILS approach line. In one embodiment, the transition point is indicated by ending the ILS approach line at a point where the ILS approach line intersects the extended runway center line (560). Additionally, after the aircraft has reached the transition point, in one embodiment the method further comprises ceasing the display of the ILS approach line during and approach after reaching a transition point (570).

Figure 6:
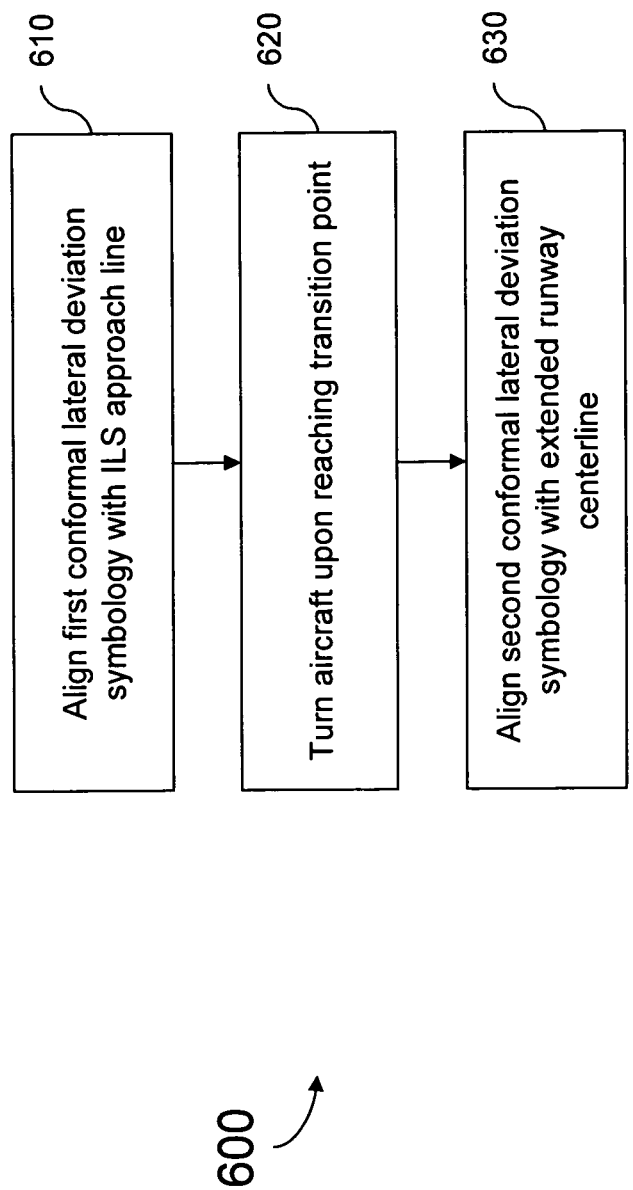
FIG. 6 is a flow chart illustrating a method for landing an aircraft at an airport runway having an offset ILS approach, of one embodiment of the present invention.

FIG. 6 illustrates a method 600 for landing an aircraft at an airport runway having an offset ILS approach. The method comprises aligning a first conformal lateral deviation symbology with an ILS approach line during an approach prior to reaching a transition point (610). As previously discussed, the first conformal lateral deviation symbology indicates to the pilot the degree of the aircraft's lateral deviation from the ILS approach line. The pilot maneuvers the aircraft's flight controls to maintain the alignment of the first conformal lateral deviation symbology with the ILS approach line up until the transition point. In response, the aircraft will follow the ILS approach towards the runway. The method further comprises turning the aircraft upon reaching the transition point (620) towards the actual runway centerline. At the transition point, the ILS approach line no longer provides valid information for landing the aircraft on the runway. Therefore, the pilot discontinues aligning the first conformal lateral deviation symbology with the ILS approach line at the transition point. Instead, the method continues with aligning a second conformal lateral deviation symbology with an extended runway center line after reaching the transition point (630). The second conformal lateral deviation symbology indicates to the pilot the degree of the aircraft's lateral deviation from the extended runway center line. The pilot maneuvers the aircraft's flight controls to maintain the alignment of the second conformal lateral deviation symbology with the extended runway center line through completion of the landing. In response, the aircraft will be properly aligned with the center line of the runway as the aircraft touches down onto the runway.

Several means are available to implement the graphics generating processor of the current invention. These means include, but are not limited to, digital computer systems, programmable controllers, or field programmable gate arrays. Therefore other embodiments of the present invention are program instructions resident on computer readable media which when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for displaying lateral deviation symbology in offset approaches on a display associated with an aircraft, the method comprising:
    displaying an extended runway center line on the display, the extended runway center line corresponding to a center line of a runway; and
    displaying an approach line on the display, the approach line being based on one or more position points derived from signals corresponding to an offset approach to the runway received by the aircraft, wherein the approach line is offset from the extended runway center line such that the approach line provides a visual indication of the degree of offset between the offset approach and the center line of the runway.

2. The method of claim 1, further comprising receiving, by an ILS receiver onboard the aircraft, ILS signals corresponding to an ILS approach for the offset approach, resulting in received ILS signals, wherein the one or more position points are based at least in part on the received ILS signals, such that the approach line provides a visual indication of the degree of offset between the offset approach and the center line of the runway.

3. The method of claim 2, further comprising determining the one or more position points by performing a calibration based on the received ILS signals and runway configuration data for the runway.

4. The method of claim 1 further comprising:
    displaying a first conformal lateral deviation symbology with respect to the approach line during an approach prior to the aircraft reaching a transition point; and
    displaying a second conformal lateral deviation symbology with respect to the extended runway center line during an approach after reaching the transition point.

5. The method of claim 4, the first conformal lateral deviation symbology being displayed in a first color, wherein displaying the second conformal lateral deviation symbology comprises changing the first conformal lateral deviation symbology from the first color to a second color in response to determining the aircraft has reached the transition point.

6. The method of claim 4 wherein the first conformal lateral deviation symbology is differentiated from the second conformal lateral deviation symbology by one or more of a different color, a different line thickness, or a different line style.

7. The method of claim 1 wherein the extended runway center line is a different color from the approach line.

8. The method of claim 1 further comprising: indicating a transition point corresponding to a point where the aircraft should deviate from the offset approach and turn the aircraft towards the runway by ending the approach line where the approach line intersects the extended runway center line.

9. A method for landing an aircraft at an airport runway having an offset approach, the method comprising:
    displaying an extended runway center line on a display associated with the aircraft, the extended runway center line corresponding to a center line for the airport runway;
    displaying an approach line on the display, the approach line being based on one or more position points derived from signals corresponding to the offset approach received by the aircraft, wherein the approach line is offset from the extended runway center line such that the approach line corresponds to the offset approach;
    aligning a first conformal lateral deviation symbology with the approach line;
    turning the aircraft upon reaching a transition point, the transition point corresponding to an intersection of the approach line and the extended runway center line; and
    aligning a second conformal lateral deviation symbology with the extended runway center line after reaching the transition point.

10. The method of claim 9, wherein the approach line is an ILS approach line.

11. A non-transitory computer-readable medium having computer executable program instructions for a method for displaying, on a display, lateral deviation symbology in offset approaches, the method comprising:
    notifying a flight crew of the existence of an offset approach for a runway;
    displaying an extended runway center line on the display, the extended runway center line corresponding to a center line of the runway; and
    displaying an approach line on the display, the approach line being based on one or more position points derived from received signals corresponding to the offset approach for the runway, wherein the approach line is offset from the extended runway center line.

12. The non-transitory computer-readable medium of claim 11, the method further comprising:
    displaying a first conformal lateral deviation symbology with respect to the approach line during the offset approach prior to reaching a transition point; and displaying a second conformal lateral deviation symbology with respect to the extended runway center line during the offset approach after reaching the transition point.

13. The non-transitory computer-readable medium of claim 12 wherein the first conformal lateral deviation symbology is distinguishable from the second conformal lateral deviation symbology.

14. The non-transitory computer-readable medium of claim 13 wherein the first conformal lateral deviation symbology is differentiated from the second conformal lateral deviation symbology by one or more of a different color, a different line thickness, or a different line style.

15. The non-transitory computer-readable medium of claim 11, wherein the extended runway center line is a different color from the approach line.

16. The non-transitory computer-readable medium of claim 11, the method further comprising: indicating a transition point by ending the approach line at a point where the approach line intersects the extended runway center line.

17. The non-transitory computer-readable medium of claim 11, the method further comprising: ceasing the display of the approach line during and approach after reaching a transition point.

18. The non-transitory computer-readable medium of claim 11 wherein the method further comprises:
receiving ILS signals corresponding to the offset approach for the runway, resulting in received ILS signals; and
determining the one or more position points by calibrating the received ILS signals and runway configuration data for the runway.

* * * * *